US007028033B2

(12) United States Patent
Bright et al.

(10) Patent No.: US 7,028,033 B2
(45) Date of Patent: Apr. 11, 2006

(54) METHOD AND APPARATUS FOR SIMPLIFIED ACCESS TO ONLINE SERVICES

(75) Inventors: Walter G. Bright, Kirkland, WA (US); Eric Engstrom, Kirkland, WA (US)

(73) Assignee: Hall Aluminum LLC, Los Altos, CA (US)

( * ) Notice: Subject to any disclaimer, the term of this patent is extended or adjusted under 35 U.S.C. 154(b) by 900 days.

(21) Appl. No.: 09/754,001

(22) Filed: Jan. 2, 2001

(65) Prior Publication Data

US 2002/0087545 A1    Jul. 4, 2002

(51) Int. Cl.
*G06F 17/30* (2006.01)

(52) U.S. Cl. .................. 707/10; 707/9; 707/8
(58) Field of Classification Search .................... 707/3, 707/6, 9, 10, 100; 709/203, 217, 218, 219, 709/229; 705/1
See application file for complete search history.

(56) References Cited

U.S. PATENT DOCUMENTS

| | | | | |
|---|---|---|---|---|
| 5,815,665 A | * | 9/1998 | Teper et al. | 709/229 |
| 5,903,729 A | * | 5/1999 | Reber et al. | 709/219 |
| 6,408,336 B1 | * | 6/2002 | Schneider et al. | 709/229 |
| 2002/0161589 A1 | * | 10/2002 | Strandberg | 705/1 |

\* cited by examiner

*Primary Examiner*—Charles Rones
*Assistant Examiner*—Neveen Abel-Jalil
(74) *Attorney, Agent, or Firm*—Schwabe, Williamson & Wyatt, P.C.

(57) ABSTRACT

An online service provider is equipped to receive a request from a client to access a subscribed online service of a subscriber at the online service provider. Comprising the request is a globally unique identifier (GUID) of the subscriber. Once the request is received, the online service provider, determines if the GUID is associated with the subscriber, and if the GUID is associated with the subscriber, the online service provider facilitates access to the subscribed online service of the subscriber. As a result, a user is able to access online services without having to manage several a logon Id and password pair. In one embodiment, the GUID is also caused to be stored in an email with an email service provider. The novel storage enables the subscriber to access his/her subscribed services from another location, or even after the subscriber has reconfigured the original location.

10 Claims, 7 Drawing Sheets

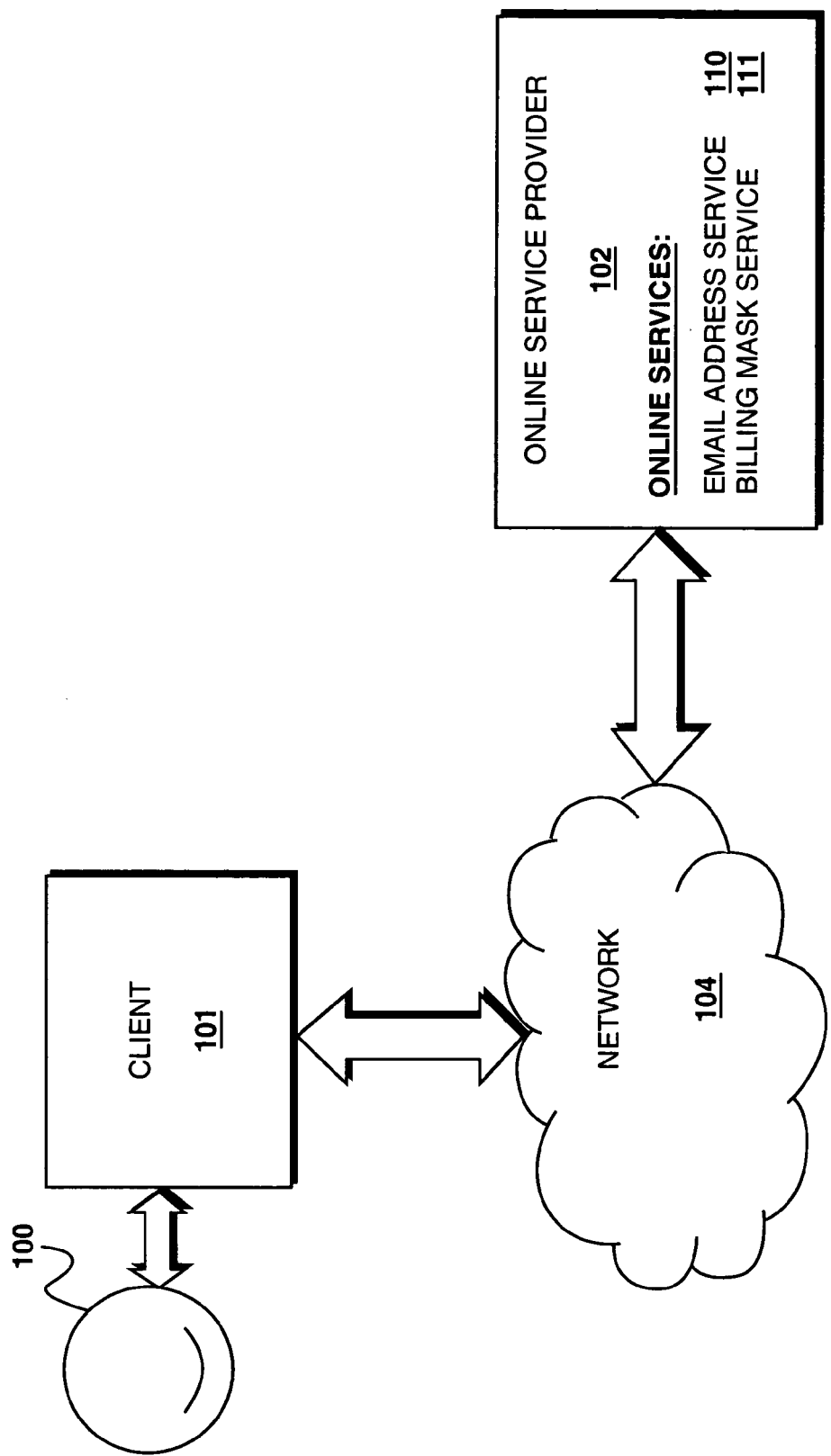

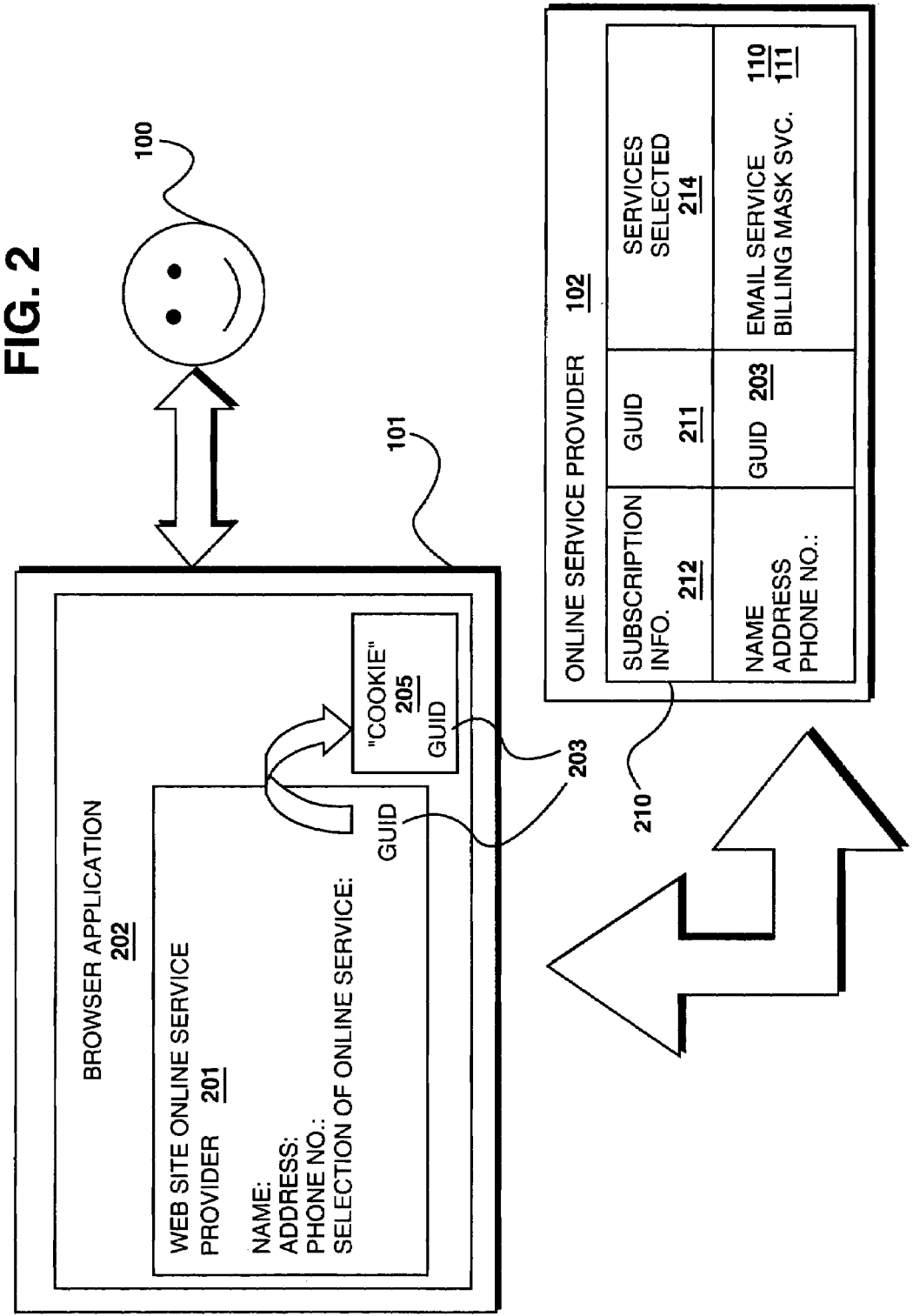

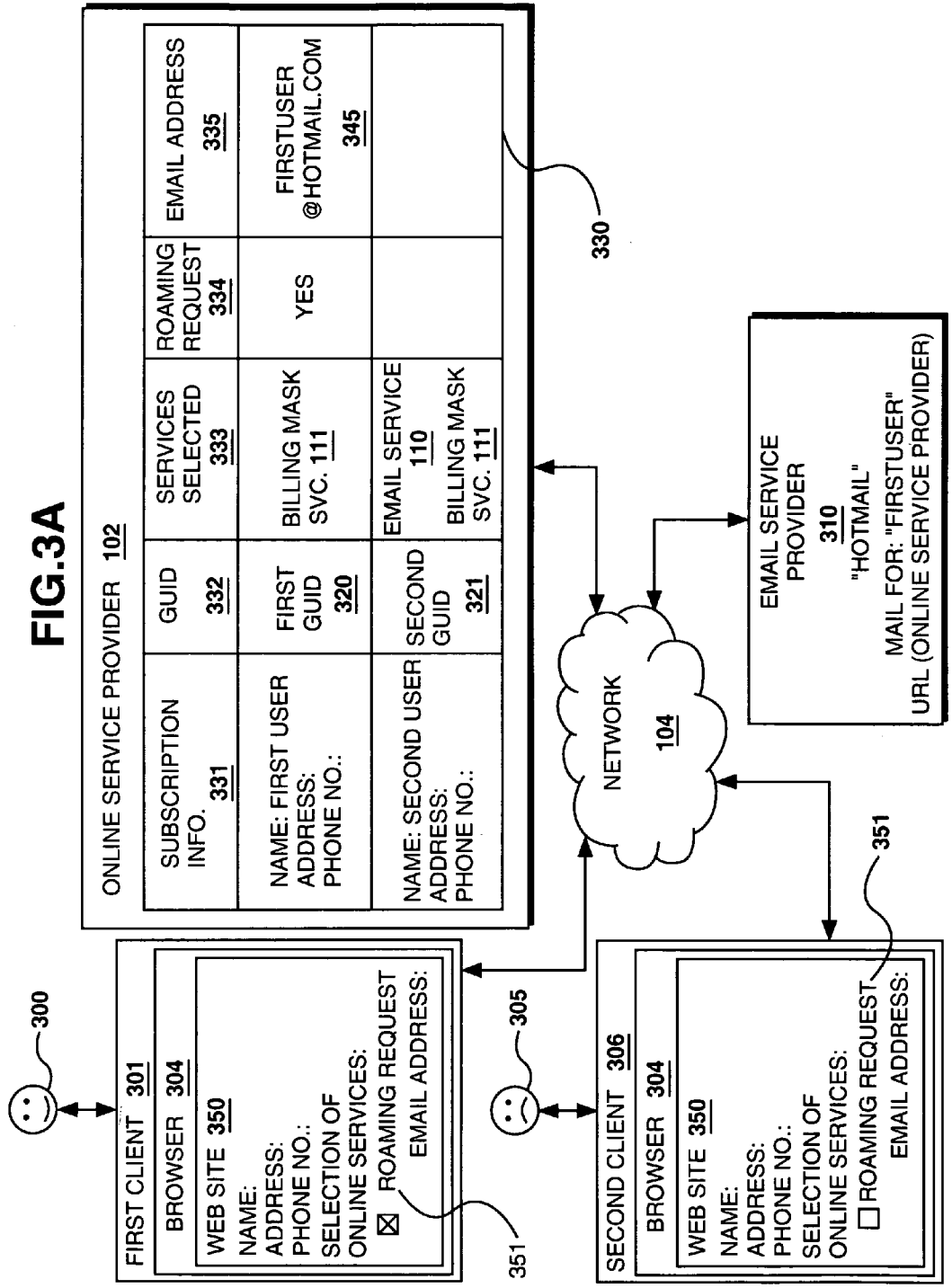

METHOD AND APPARATUS FOR SIMPLIFIED ACCESS TO ONLINE SERVICES

FIELD OF THE INVENTION

The present invention relates to the field of information systems. More specifically, the present invention relates to simplified access to online services, including access with roaming capabilities.

BACKGROUND OF THE INVENTION

The Internet is a well-known collection of public and private data communication and multimedia networks that operate using common protocols to form a world wide network of networks. Recently there has been an explosion in the availability of online services, e.g., online commerce sites, email sites, news information sites, and so forth, all reachable over the Internet. This rapid growth is due, in part, to the availability of fast, reliable and affordable computing device systems and the general simplification of networking device hardware and configuration. Thus, consumers and businesses alike now have access to hardware that makes effective online commerce commercially practicable.

To access these online services, an online service provider typically sets up a home page (e.g., "web site") on the World Wide Web, which is a logical overlay of the Internet. Simply, web sites are machines located someplace within the Internet with traditional naming conventions for the machines, e.g., named WWW, and holding themselves available to interact using standard protocols such as Hypertext Transfer Protocol (HTTP), and programming languages or environments such as Hypertext Transfer Protocol HTML, XML, Java, JavaScript, Java Beans, ActiveX, Visual Basic, or the like.

To access a service via a web site, a user executes a "browser," such as the Internet Explorer, Netscape Navigator, or other network aware application program that is configured to communicate with an online service provider's web site. The user locates a particular online service provider, and proceeds to logon to the web site (or equivalent) to access and utilize the service. At this point, the user must enter their logon identification (Id), password, and other data sufficient to identify the user and allow access of the user to the service.

As the user accesses several services, the user is required to maintain several logon identification and passwords. For example, a user may request to access several services such as Hotmail® for email services, HomeGrocer.com® for home delivered groceries, Washington Mutual Bank™ for online banking, and so forth.

Often times, in order to keep track of the different logon Ids and passwords, a user may try to use a common logon Id, such as "Justin", and password for several services. However, more than likely, a logon Id for one service is rejected by another service because of the likelihood that some other user would have the same logon Id is high unless one constructs an arbitrary user Id. In that case, the user Id is difficult to remember and user unfriendly. Depending on the number of services utilized by the user, the user may be required to have and manage numerous different logon Ids and passwords.

One known method for managing the several different logon Ids and passwords is to store this information within the computer or device for accessing the various services. However, because this information is stored within the device, if the device is altered and/or loses its memory or the user roams to different devices, the user is required to repeat the process of setting up the several logon Ids and passwords in order to access the different services again. Further, the user would not have access to his/her configuration information.

Thus, what is needed is an environment that provides a user the ability to access online services requiring logon Ids and passwords and roam from one device to another without having to manage several logon Ids and passwords, nor several sets of configuration information.

BRIEF DESCRIPTION OF DRAWINGS

The present invention is illustrated by way of example and not by way of limitation in the figures of the accompanying drawings, in which the like references indicate similar elements and in which:

FIG. 1 illustrates a user 100 accessing several online services through a network 104, in accordance with one embodiment of the invention;

FIG. 2 illustrates an online service provider utilized by a user to access several online services without having to provide logon identifications and passwords for each of the online service, in accordance with one embodiment of the invention;

FIGS. 3a and 3b illustrate an alternate embodiment of the invention where one or more users from selected ones of different clients may access and utilize one or more online services through an online service provider (i.e. with roaming capability) without having to manage several logon identifications and passwords, and configurations, in accordance with the invention;

DETAILED DESCRIPTION OF THE INVENTION

Figure 3B:
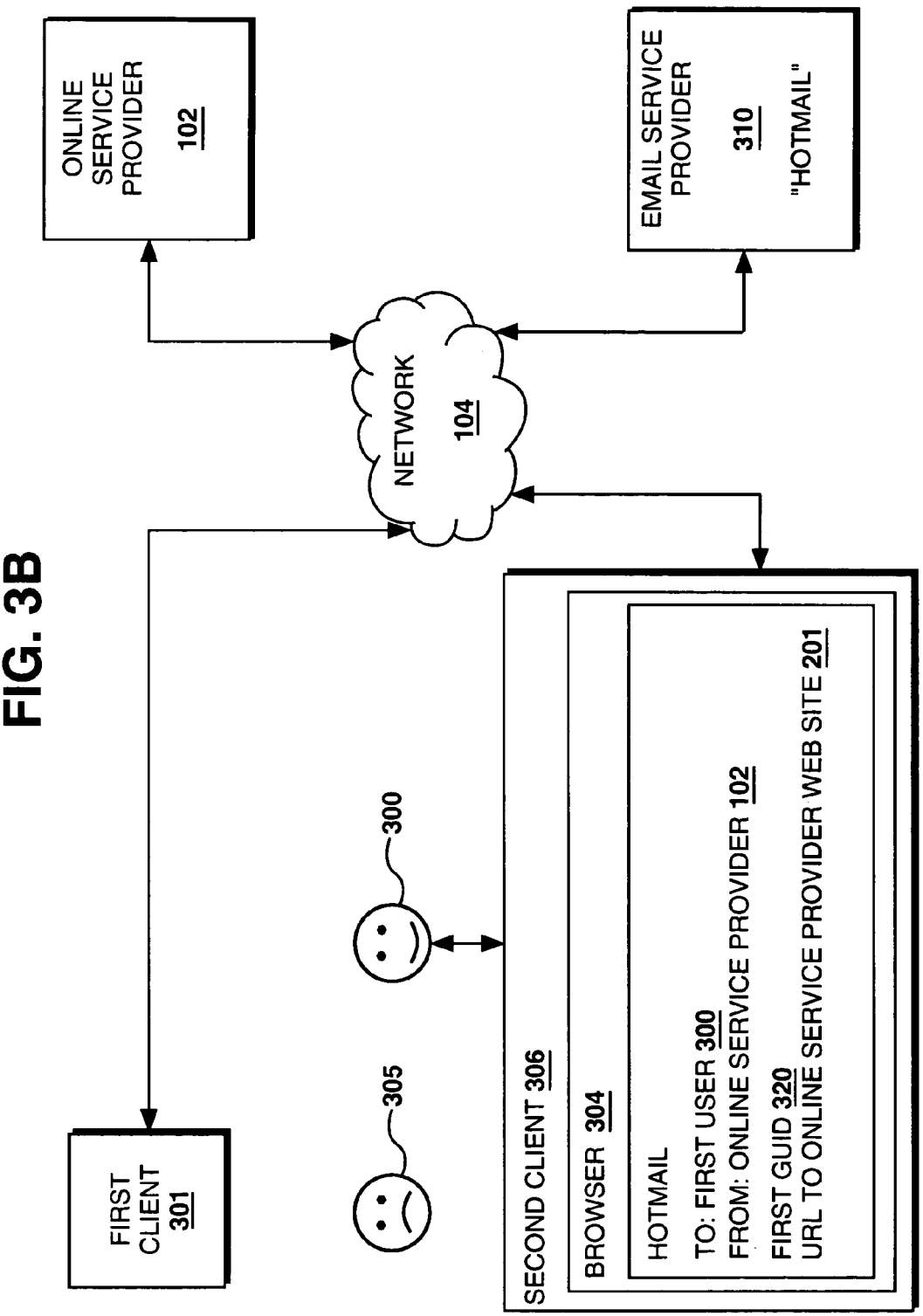

In the following description, various aspects of the invention will be described. However, it will be apparent to those skilled in the art that the invention may be practiced with only some or all aspects of the invention. For purposes of explanation, specific numbers, materials and configurations are set forth in order to provide a thorough understanding of the invention. However, it will also be apparent to one skilled in the art that the invention may be practiced without the specific details. In other instances, well known features are omitted or simplified in order not to obscure the invention.

Parts of the description will be presented using terms such as end-user interfaces, buttons, and so forth, commonly employed by those skilled in the art to convey the substance of their work to others skilled in the art. Parts of the description will be presented in terms of operations performed by a computing device, using terms such as submitting, requesting, selecting, confirming and so forth. As well understood by those skilled in the art, these quantities and operations take the form of electrical, magnetic, or optical signals capable of being stored, transferred, combined, and otherwise manipulated through mechanical and electrical components of a digital system. The term digital system includes general purpose as well as special purpose computing machines, systems, and the like, that are standalone, adjunct or embedded.

Various operations will be described in turn in a manner that is most helpful in understanding the invention, however, the order of description should not be construed as to imply that these operations are necessarily order dependent. Furthermore, the phrase "in one embodiment" will be used repeatedly, however the phrase does not necessarily refer to the same embodiment, although it may.

In various embodiments of the invention, a user is able to access online services requiring logon configurations and roam from one device to another without having to manage several logon configurations.

FIG. 1 illustrates a user 100 accessing several online services through a network 104, in accordance with one embodiment of the invention. In FIG. 1, the user 100 is in communication, via a client 101 with a network 104. Also attached to the network 104 is an online service provider 102 to provide online services, such as an unique email address service 110 (U.S. patent application Ser. No. 09/504,236) and billing masking service 111 (U.S. patent application Ser. No. 09/553,068).

It is assumed that the client 101 comprises a computing device, such as a personal computer, which operates on behalf of the user 100 (a subscriber to online service provider 102). In alternate embodiments, the client 101 may be incorporated into an electronic card, a telephone, a personal digital assistant (PDA), a portable audio device, a portable audiovisual device, a cellular telephone, a keychain dongle, or within an automobile or other transportation device.

Also shown in FIG. 1, the online service provider 102 is in communication with the user 100, via the client 101, through the network 104, in accordance with the invention. The user 100 subscribes to the online service provider 102, via the client 101, through any number of subscription processes known in the art. The user 100 may be charged a fee for allowing the user to access the online services 110–111. This subscription data is received by the online service provider 102, where the online service provider 102 is configured to allow the user 100 to access several online services 110–111 without having to manage a logon Id and password pair. Simplified access and utilization of the online services 110–111 is facilitated by the online service provider 102 associating an identifier with the user 100 and his/her subscribed online services 110–111, for example, a globally unique identifier (GUID), in accordance with the invention. Generation of identifiers such as GUIDs, which may involve adding a date and time to a serial number of a device in a client, is known, and accordingly, will not be discussed further. As a result, a user is able to access several online services through an online service provider without having to manage a logon Id and password pair.

Moreover, the invention provides an approach to allow the configuration information (such as the user's subscribed online services and the user's preference settings) of the user to be available, even if the user accesses the online service from different devices (to be described more fully below).

FIG. 2 illustrates an online service provider utilized by a user to access several online services without having to provide logon Id and password, in accordance with one embodiment of the invention. In the one embodiment illustrated in FIG. 2, in order to subscribe with the online service provider 102, the user 100 communicates with a web site 201 of the online service provider 102 through a browser application program 202 of the client 101.

The subscription data may include user information such as name, address, phone number, and the various online services (such as the unique email address service, billing masking service) the user is interested in. As the user 100 subscribes to these online services with the online service provider 102, the web site 201 of the online service provider 102 generates an identifier corresponding to the user 100, for example, a GUID 203 associated with the client 101 and the user 100. The subscription data and the GUID 203 is received at the online service provider 102. Furthermore, the web site of the service provider 102 deposits the GUID 203 within the client 101. Depositing of the GUID 203 within the client 101 may be in any form known in the art such as, but not limited to, a "cookie" 205 stored on the browser application program 202 of the client 101. Subsequently, when the user 100 communicates with the web site 201 of the online service provider 102 through the browser application program 202 (such as Internet Explorer) with the deposited GUID 203, the online service provider 102 may be provided with the GUID 203.

Once the user 100 subscribes to the various services of the online service provider 102, the online service provider 102 associates the received GUID 203 with the user 100, which in turn associates GUID 203 with the one or more subscribed online services 110–111. The number of online services 110–111 associated with the GUID 203 will depend upon the number of online services the user selects to subscribe, for example, the user 100 may select to subscribe to both online services 110–111 shown, in which case, the online service provider 102 will associate the GUID 203 with user 100 and both of the online services 110–111.

Illustrated in FIG. 2, is a data structure suitable for use to store data for facilitating access to several online services by the online service provider 102. The data structure may be a table 210 including a number of columns 212–214 for storing various information associated with the user 100, such as but not limited to, a user's subscription information 212, a GUID of a client 211, and the online services that a user has selected to access through the online service provider 214. As shown in table 210, the GUID 203 is associated with the user and his/her selected services 110–111.

The table 210 is illustrated as a single table for ease of understanding. As those skilled in the art will appreciate, a data structure involving multiple tables as well as other non-tabular data structures may be employed for storing various data regarding user information.

As a result, when the user requests access to an online service by communicating with the web site 201 of the online service provider 102 through the browser application program 202 of the client 101, the online service provider 102, receives the deposited GUID 203, e.g., within the "cookie" 205 at the client 101, and determines if the received GUID 203 is associated with a subscribed user and what the subscribed service(s) are. If the received GUID 203 is associated with a subscribed user, the online service provider provides access to all of the subscribed online services 110–111 associated with the GUID 203 without requiring the user to provide a logon Id and password.

The online service provider 102 associates the GUID 203 of the user 100 with any number of online services 110–111 depending upon the online services selected by the user 100. Three online services are shown in FIG. 2; however, it should be appreciated by those skilled in the art that the number of online services may be any number of online services, which an online service provider may provide.

In FIG. 2, having previously subscribed with the online service provider 102, the user 100 communicates with the web site 201 of the online service provider 102 through the browser application program 202 on the client 101. In turn, the online service provider 102 receives the GUID 203 from the client 101 and facilitates access to the online services 110–111 by matching the received GUID 203 with the online services associated with the GUID 203.

As a result, under the invention, a user is not required to manage a logon Id and password pair in order to utilize and access several online services.

FIGS. 3a and 3b illustrate an alternate embodiment of the invention where one or more users from selected ones of different clients may access and utilize one or more online services through an online service provider without having to manage logon Id and password pairs, in accordance with the invention. In the illustrated embodiment, because an identifier, such as a GUID, is associated with the online service(s) selected by the user(s), one or more users may access one or more online services without regard for a particular client, i.e., roaming capability is provided to the one or more users allowing the access and utilization of one or more services from any client in any location.

In FIG. 3a, a first user 300 and a second user 305 are in communication with the online service provider 102 through the network 104. Also shown in FIG. 3a, are a first client 301 and a second client 306, each of which may be in different locations. Also shown in FIG. 3a, is an email service provider 310 in communication, through the network 104, with the online service provider 102 and the first and second users 300 and 305 through their respective first and second clients 301 and 306. The email service provider may be any email service provider such as, but not limited to, Hotmail®. The second user 305 may or may not be in communication with the first user 300. Additionally, as discussed with respect to FIG. 2, since the online service provider 102 offers several online services 110–111, the first user 300 and the second user 305 may select to access different online services 110–111, for example, the first user 300 may select billing masking service 111, while the second user 305 may select both services 110–111.

As discussed with respect to FIG. 2, the first user 300 and the second user 305 subscribe with the online service provider 102 via browser application programs 304 included within each client. In the embodiment shown in FIG. 3a, the first user 300 fills in the fields of the web site 350 of the online service provider 102 to subscribe with the online service provider 102. Shown in the embodiment of FIG. 3a, the online service provider 102 determines if a request for roaming capability is received from any of the users by detecting whether or not the roaming request field 351 is filled in by the user(s). Shown in FIG. 3a, the roaming request field 351 is a check box; however, it should be appreciated by those skilled in the art that the field may be any type of field to be filled in known in the art.

In FIG. 3a, the online service provider 102 receives the request for roaming capability from the first user 300, and as will be described in further detail below, the online service provider 102 facilitates the roaming capability for the first user 300 by utilizing the GUID of the first client 301, in accordance with the invention.

As shown in FIG. 3a, the online service provider 102 receives the subscription data from the first user 300 and the second user 305. Included within the subscription data is a first GUID 320 corresponding to the first client 301 and a second GUID 321 corresponding to the second client 306. Included within the request for roaming capability from the first user 300, is information regarding the subscribed services utilized by the first user 300.

As discussed with respect to FIG. 2, included within the online service provider is a data structure suitable for use to store data associated with facilitating access to several online services by the online service provider 102. Here again, the data structure may be a table 330 including a number of columns 331–335 for storing various information associated with one or more users. In particular, a column for a request of roaming capability 334 and a column for email addresses 335 associated with request for roaming capability column 334.

Shown in FIG. 3a, is a GUID column 332 corresponding to one or more users, with each user having a different GUID. Additionally, online service columns 333 for the online services selected by the one or more users is shown corresponding to one or more users. As shown in table 330, the online service provider 102 associates the first GUID 320 with the billing masking service 111, selected by the first user 300, and the online service provider 102 associates the second GUID 321 with both of the online services 110–111, selected by the second user 305. Even though two users are shown, it should be appreciated by those skilled in the art that the number of users and GUIDs may be several according to the number of users subscribed with the online service provider.

In order to facilitate roaming capability of the first user 300 utilizing the GUIDs, the online service provider 102 sends the first GUID 320 from the GUID column 332 corresponding to the first user 300, along with a uniform resource locator (URL) of the online service provider 102 to connect to the web site 201 of the online service provider 102, to the email address 345 (e.g., a Hotmail® email account) specified by the first user 300 in email address column 335.

Referring now to FIG. 3b, the first user 300 leaves the first client 301 and moves to the location of the second client 306. Once at the second client 306, the first user 300 retrieves email from the email service 310. The first user may retrieve email from the email service 310 by any methods known in the art, such as but not limited to, using the POP protocol, or through a web service.

The first user 300 at the second client 306 receives the email from the online service provider 102, containing the first GUID 320 corresponding to the first user 300 and the URL to the web site 201 of the online service provider 102. Once the first user 300 at the second client 306 receives the email, the first user 300 "clicks" on the URL to the online service provider web site 201 and requests access to online service by communicating with the web site 201. Because the URL contains the first GUID 320 of the first user 300, the first user 300 is able to access all of the online credit card service 110 from the device of second client 306 without providing a logon Id and password pair to the online service provider 102, including the user's configuration setting. The URL and the GUID are stored in the received email.

Optionally, if the first user 300 intends to utilize the device of second client 306 for a period of time, the first user 300 may request that the first GUID 320 be deposited on the browser application program 304 of the second client 306 as discussed with respect to FIG. 2. The deposited GUID may be removed before the first user 300 moves to another client device (not shown).

As those skilled in the art would appreciate, as long as the first user 300 leaves the email with the GUID in the email received device, the first user 300 may roam to another device, repeat the process, and have access to his/her subscribed services, including his/her preference on the manner the services are rendered.

As a result, a user is able roam from one client to another client and still benefit from the ability to access and utilize several online services without the need for a logon Id and password pair.

Additionally, if a client of a user, for whatever reasons, has to be reconfigured, under the invention, the user is still able to access online services (including his/her preferred configurations) through an online service provider without the need to provide a logon Id and password pair. Similar to the earlier described roaming scenario, upon reconfiguring the user's machine to a level of operation that includes the ability to access the email service having the email containing the GUID and the URL of the web site of the online service provider, the user accesses the email service and retrieves the email from the email service. Thereafter, the user is able to proceed to access his/her subscribed online services, through his/her reconfigured client, in the same manner described earlier for the roaming scenario.

Figure 4:
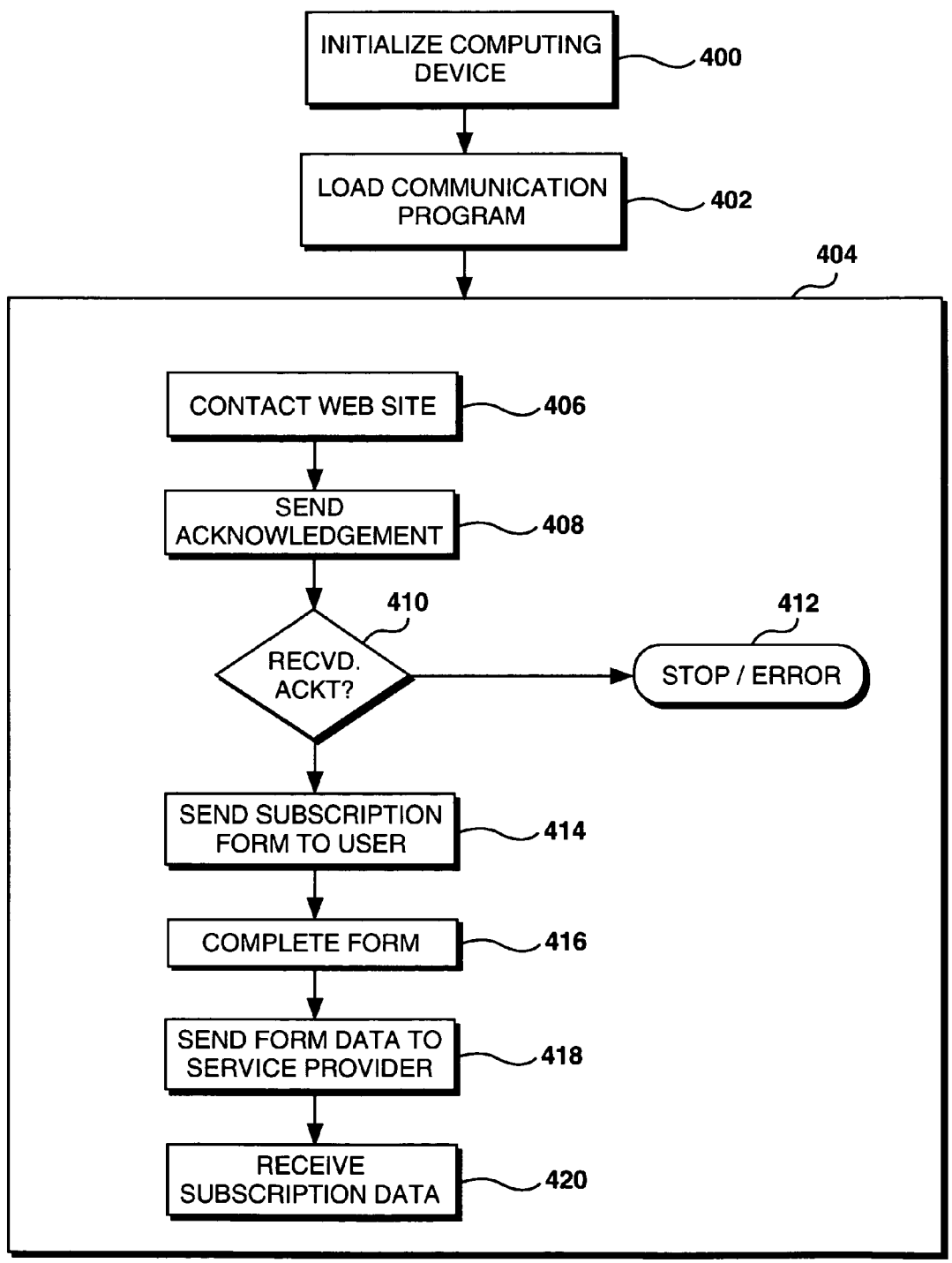
FIG. 4 is a flow chart according to one embodiment of the invention, illustrating a client subscribing with an online service provider for accessing one or more online services without the need for managing several logon identifications and passwords, and configurations, with the roaming capability.

FIG. 4 is a flow chart according to one embodiment of the invention, illustrating a client subscribing with an online service provider for accessing one or more online services without the need for a logon Id and password pair with the roaming capability.

The first illustrated operation is the user initializing 400 the computing device. It is assumed that initializing includes all steps required to boot, wake from idle state, or otherwise start the computing device and configure it for accessing online services. Assume that the computing device is a desktop personal computer executing the Microsoft Windows® operating system. After initialization, the user loads 402 a communication program through which to access online services.

It will appreciated that a number of environments may be used to be implement the communication program. For example, a dedicated / custom application program may be designed to access online services over a network. Alternatively, the communication program can be built using communication features provided by Internet web browser products, such as Microsoft Internet Explorer™, Netscape Navigator™, or Opera™. In this latter environment, the communication may be implemented in one of, or a combination of, Java, JavaScript, JavaBeans, ActiveX, Visual Basic, HTML, DHTML, or other Internet related programming "languages". It is assumed herein that the communication program is based on an Internet browser, and that traditional Internet related communication protocols (e.g., TCP/IP, http, etc.) are used to communicate online service providers over the Internet. As discussed with respect to FIG. 2–3b, the online service provider provides a web address to which a client can connect to access online services provided by the online service provider.

After communication program initialization, the computing device is used to subscribe 404 the user with a web site maintained by a online service provider. Note, however, that even though the illustrated embodiment requires subscription, it will appreciated that in other embodiment, such subscription need not occur first, or at all. To subscribe, the computing device contacts 406 the web site. In response the web site sends an acknowledgment 408. Since an Internet browser is assumed in use, the contact is by way of directing the browser to an appropriate receiving port monitored by a web server of the online service provider. It is assumed that port 80, the traditional Internet communication port, is used for communication. In the web browser context, acknowledgment can be determined by receiving a "home page" or start page from the online service provider's web server.

If no acknowledgment is received, then a subscription error has occurred and processing of this subscription halts 412. If acknowledgment is received, then the client tells the online service provider that it is interested in subscribing with the online service provider.

In one embodiment, the subscription process is automated, where the online service provider server (not shown) is configured to receive a subscription command from the client, and in response, the online service provider sends the client subscription forms to complete. For example, in response to the subscription command, an HTML form (or equivalent structure) containing fields for the user's name, address, request for roaming capability, email address, and so forth, is sent 414 to the client. This form (or equivalent structure) is completed 416 and returned 418 to an online service provider. In response to receiving the subscription data, the online service provider processes the received subscription data by correlating and associating an identifier of the user and the client, included within the received subscription data, with online service(s) selected by the user 420.

Completion of the form can be automated, through automated parsing of the form to identify various fields to fill out. In one embodiment, the extensible markup language (XML) is used to encode forms with semantic meaning to facilitate automatic interpreting and completing of a form. In an alternate embodiment, the user is allowed to review and complete a form with data known to the user, or the user can be provided with an opportunity to review and change a form completed by the computing device. In another embodiment, a special communication port, analogous to browser port 80, is used to send and receive subscription data.

Figure 5:
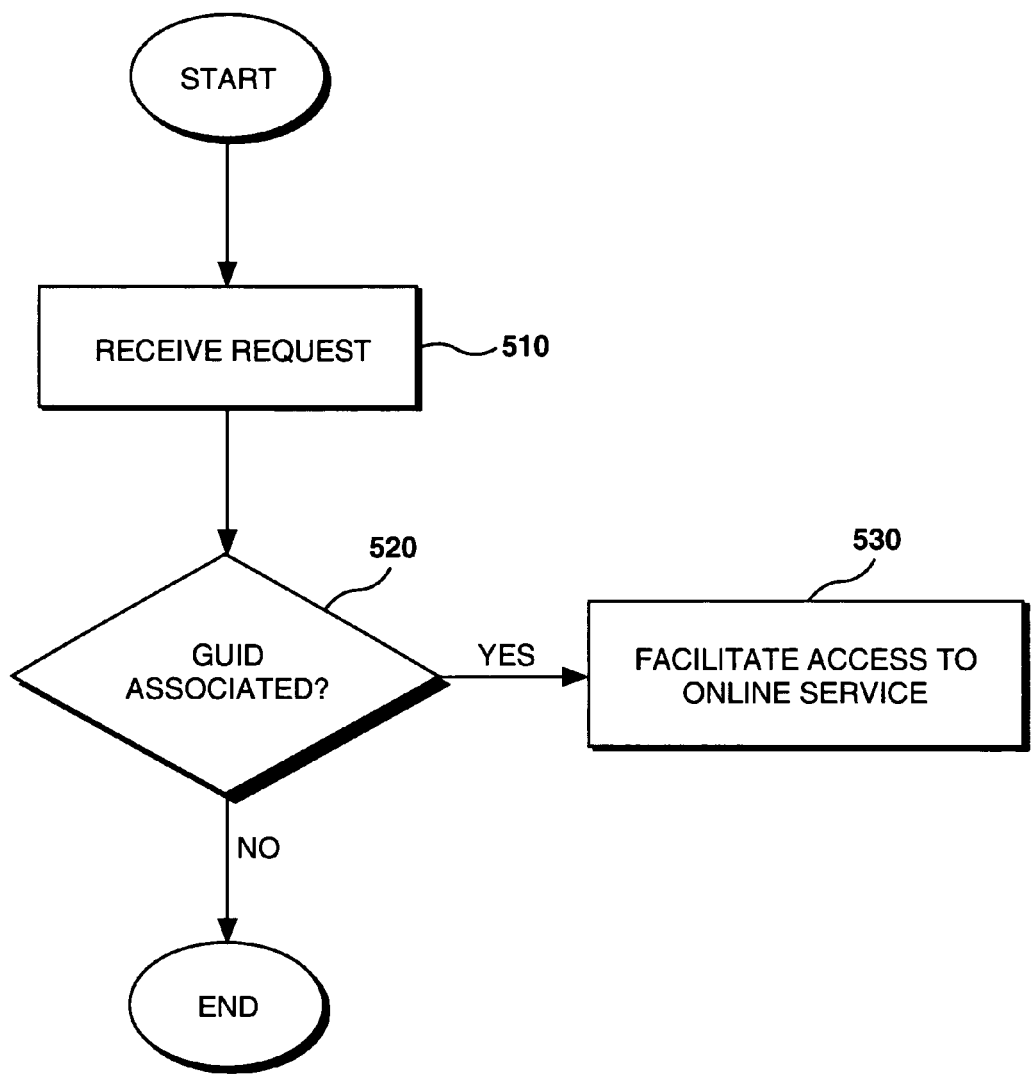
FIG. 5 illustrates the operational flow of the relevant aspects of the online service provider 102 facilitating access to online services and roam from one device to another without having to manage several logon identifications and passwords, and configurations.

FIG. 5 illustrates the operational flow of the relevant aspects of the online service provider 102 for facilitating access to online services requiring logon configurations and roam from one device to another without having to manage several logon Ids and passwords, and configurations. As illustrated in FIG. 5, an online service provider receives a request from a client to access an online service, 510. Comprising the request is a globally unique identifier (GUID) of the client.

In response to the received GUID, the online service provider determines if the GUID is associated with a subscriber, 520. The online service provider associates the GUID of the client with the online services of the identified user based at least upon subscription data previously received when a user subscribed with the online service provider.

If the online service provider determines that the GUID is associated with a user, the online service provider facilitates access to the subscribed online service of the user without requiring logon Id and password pair, 530. Accordingly, a user can access the online services from other locations as well (i.e., roaming), or from a reconfiguration machine as well, thereby significantly improving the user friendliness of online service provider, and the user's productivity.

Figure 6:
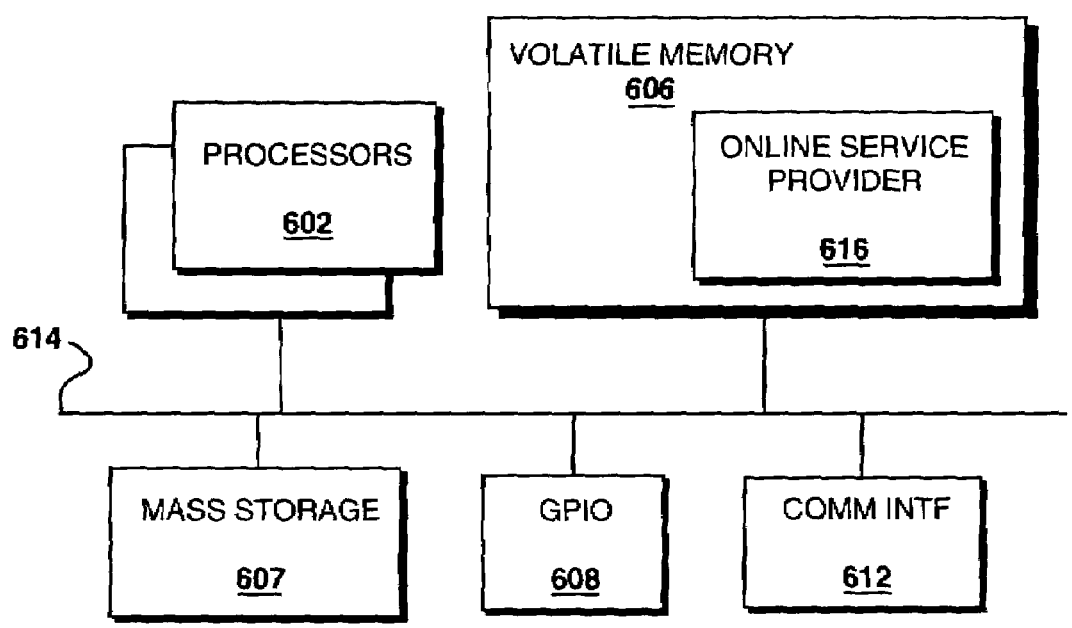
FIG. 6 illustrates an example server suitable for use for online service provider 102 of FIG. 1, in accordance with one embodiment.

FIG. 6 illustrates an example server suitable for use for online service provider 102 of FIG. 1, in accordance with one embodiment. As shown, server 600 includes one or more processors 602 and system memory 606. Additionally, server 600 includes mass storage devices 607 (such as diskette, hard drive, CDROM and so forth), GPIO 608 (for interfacing with I/O devices such as keyboard, cursor control and so forth) and communication interfaces 612 (such as network interface cards, modems and so forth). The elements are coupled to each other via system bus 614, which represents one or more buses. In the case of multiple buses, they are bridged by one or more bus bridges (not shown). Each of these elements perform its conventional functions known in the art. In particular, system memory 604 and mass storage 606 are employed to store a working copy and a permanent copy of the programming instructions implementing access to online services 110–111. Except for its use to host the novel online service provider of the present invention, the constitution of these elements 602–614 are known, and accordingly will not be further described.

Certain embodiments may include additional components, may not require all of the above components, or may combine one or more components. Those skilled in the art will be familiar with a variety of alternative implementations.

In one embodiment, the invention, as described above, is implemented using one or more computing devices such as the server of FIG. 6. In one embodiment, the invention is implemented as software routines executed by one or more execution units within the server(s). For a given server, the software routines can be stored on a storage device, such as system memory 620.

In one embodiment, the software routines are written in the C programming language. It should be appreciated that the software routines may be implemented in any of a wide variety of programming languages. In alternate embodiments, the invention is implemented in discrete hardware or firmware. For example, one or more application specific integrated circuit (ASICs) could be programmed with one or more of the above described functions of the server 600. In another example, one or more functions of the server 600 could be implemented in one or more ASICs on additional circuit boards, and the circuit boards could be inserted into the device(s) described above. In another example, field programmable gate arrays (FPGAs) or static programmable gate arrays (SPGAs) could be used to implement one or more functions of the invention. In yet another example, a combination of hardware and software could be used to implement one or more functions of the invention.

Accordingly, methods and apparatuses for a user to access online services requiring logon configurations and roam from one device to another without having to manage several logon configurations is described. While the present invention has been described in terms of the above illustrated embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A method comprising:
    receiving a request from a client to access a subscribed online service of a subscriber at an online service provider, said request comprising a globally unique identifier (GUID) of the subscriber;
    determining if the GUID is associated with the subscriber;
    facilitating access to the subscribed online service of the subscriber if the GUID is associated with the subscriber;
    determining if a request for roaming capability is received, said request for roaming capability includes an email address; and
    facilitating the roaming capability utilizing the received email address upon so determining.

2. The method of claim 1, wherein said facilitating comprises sending an email, including the GUID associated with the subscriber, to the email address.

3. The method of claim 1, wherein the method further comprises storing the GUID including email at an email service provider hosting said email address.

4. The method of claim 1, wherein said facilitating comprises sending an email with a uniform resource locator (URL) of the online service provider to the email address.

5. A storage medium having stored therein a plurality of instructions that are machine executable, wherein when executed, said executing instructions operate to receive a request from a client to access subscribed online services of a subscriber at an online service provider, said request comprising a globally unique identifier (GUID) of the subscriber, determine if the GUID is associated with the subscriber, facilitate access to the subscribed online services of the subscriber if the GUID is determined to be associated with the subscriber, determine if a request for roaming capability is received, said request for roaming capability includes an email address, and facilitate the roaming capability utilizing the received email address upon so determining.

6. The storage medium of claim 5, wherein said executing instructions operate to send an email, including the GUID associated with the subscriber, to the email address.

7. The storage medium of claim 5, wherein said executing instructions operate to send an email with a uniform resource locator (URL) of the online service provider to the email address.

8. An apparatus comprising:
    a storage medium having stored therein a plurality of instructions that are machine executable, wherein when executed, said executing instructions operate to receive a request from a client to access subscribed online services of a subscriber at an online service provider, said request comprising a globally unique identifier (GUID) of the client, determine if the GUID is associated with the subscriber, facilitate access to the subscribed online services of the subscriber if the GUID is determined to be associated with the subscriber, determine if a request for roaming capability is received, said request for roaming capability includes an email address, and facilitate the roaming capability utilizing the received email address upon so determining; and
    a processor coupled to said storage medium to execute said instructions.

9. The apparatus of claim 8, wherein said executing instructions operate to send an email, including the GUID associated with the subscriber, to the email address.

10. The apparatus of claim 8, wherein said executing instructions operate to send an email with a uniform resource locator (URL) of the online service provider to the email address.

* * * * *

UNITED STATES PATENT AND TRADEMARK OFFICE
CERTIFICATE OF CORRECTION

PATENT NO. : 7,028,033 B2  
APPLICATION NO. : 09/754001  
DATED : April 11, 2006  
INVENTOR(S) : Walter G. Bright and Eric Engstrom It is certified that error appears in the above-identified patent and that said Letters Patent is hereby corrected as shown below:

Column 7  
Line 43, "It will appreciated..." should read --It will be appreciated...--.  
Line 66, "...it will appreciated..." should read --...it will be appreciated...--.  
Line 66, "...in other embodiment..." should read --...in other embodiments...--.

Column 8  
Line 46, "...and roam from..." should read --...and roaming from...--.

Signed and Sealed this

Tenth Day of April, 2007

JON W. DUDAS  
*Director of the United States Patent and Trademark Office*